United States Patent
Chen et al.

(10) Patent No.: US 9,875,210 B2
(45) Date of Patent: Jan. 23, 2018

(54) METHOD AND APPARATUS OF USB 3.1 RETIMER PRESENCE DETECT AND INDEX

(71) Applicant: Intel Corporation, Santa Clara, CA (US)

(72) Inventors: Huimin Chen, Portland, OR (US); Howard L. Heck, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 14/317,874

(22) Filed: Jun. 27, 2014

(65) Prior Publication Data
US 2015/0378952 A1  Dec. 31, 2015

(51) Int. Cl.
H04B 10/29 (2013.01)
G06F 13/42 (2006.01)
H04B 3/58 (2006.01)

(52) U.S. Cl.
CPC ............ *G06F 13/423* (2013.01); *H04B 3/58* (2013.01); *H04B 10/29* (2013.01); *G05B 2219/25181* (2013.01); *H04B 2203/5479* (2013.01); *Y02B 60/1228* (2013.01); *Y02B 60/1235* (2013.01)

(58) Field of Classification Search
CPC ... H04L 25/0298; G06F 13/423; H04B 10/29; H04B 3/58; H04B 2203/5479; G05B 2219/25181
See application file for complete search history.

(56) References Cited

U.S. PATENT DOCUMENTS

| | | | |
|---|---|---|---|
| 7,554,932 B1 * | 6/2009 | Shurmantine | H04B 7/155 370/279 |
| 2003/0035504 A1 | 2/2003 | Wong et al. | |
| 2003/0179721 A1 * | 9/2003 | Shurmantine | H04B 7/2606 370/315 |
| 2005/0076113 A1 | 4/2005 | Klotz et al. | |
| 2008/0155073 A1 | 6/2008 | Swain | |
| 2009/0285155 A1 * | 11/2009 | Scarpa | H04L 27/0008 370/326 |
| 2011/0178831 A1 * | 7/2011 | Ravichandran | G06Q 10/06 705/7.11 |
| 2012/0311359 A1 | 12/2012 | Jaramillo | |

FOREIGN PATENT DOCUMENTS

| | | |
|---|---|---|
| TW | 200839785 A | 10/2008 |
| TW | I326414 B | 6/2010 |

OTHER PUBLICATIONS

International Search Report for PCT Application No. PCT/PCT2015/032664, dated Sep. 11, 2015, 4 pages.
Texas Instruments, "DS125RT410 Low Power Multi-Rate Quad Channel Retimer", Apr. 2011, 42 pages.
Universal Serial Bus 3.1 Specification, Revision 1.0, Jul. 26, 2013, 631 pages.
Search Report of R.O.C. Patent Application No. 104116044, dated Aug. 6, 2016, 2 pages.

* cited by examiner

*Primary Examiner* — Ernest Unelus
(74) *Attorney, Agent, or Firm* — International IP Law Group, P.L.L.C.

(57) ABSTRACT

An apparatus for retimer presence detection is described herein. The apparatus includes at least one retimer, wherein an algorithm is to enable the at least one retimer to announce its presence by asserting a bit of a presence message during link initialization. The at least one retimer can declare an index and is accessible via the index.

31 Claims, 7 Drawing Sheets

METHOD AND APPARATUS OF USB 3.1 RETIMER PRESENCE DETECT AND INDEX

FIELD

The present techniques generally relate to universal serial bus (USB) communications. More specifically, the present techniques relate to USB retimer presence detection and indexing.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The Universal Serial Bus (USB) protocol enables electronics communications in accordance with USB standards. The USB standard can define signal properties, timing, and state changes required for compatibility with the protocol. Data is transferred between one or more USB ports according to the USB standard. The ports can be located such that a signal transferring data between the ports deteriorates while traveling from one port to another. A retimer can be used to retime or synchronize the signal to mitigate deterioration during signal transfer from one port to another. Accordingly, the retimer is to synchronize and regenerate deteriorated signals from a receiving port to a transmitting port. A plurality of retimers can be placed between a host port and a device port.

As noted above, USB ports can be located such that a signal transferring data between the ports deteriorates while traveling from one port to another. Signals may also degrade when sent to and from USB Host Controllers, USB Hubs, USB Devices, or any combinations thereof. To maintain signal timing, a plurality of retimers can be placed between USB ports, host controllers, hubs, and devices. In some cases, the retimers are not discoverable or configurable for multi-protocol support.

Embodiments described herein enable a messaging protocol to allow one retimer or a plurality of retimers to announce their presence with a self-index awareness for access by their link partners. In some cases, the retimers are USB 3.1 retimers. An inband approach is used for automatic retimer presence detection and indexing such that a retimer, if equipped with capability of multi-protocol support, may be accessed by a host for feature discovery and protocol configuration. In this manner, the retimer is discoverable and configurable for multi-protocol support. Although the present techniques are described using USB3.1 retimers, the present techniques can be applied to other USB retimers, as well as other retimers such as PCI-E retimers. Moreover, other components to correct signal deterioration, such as other redrivers, can be used according to the present techniques.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
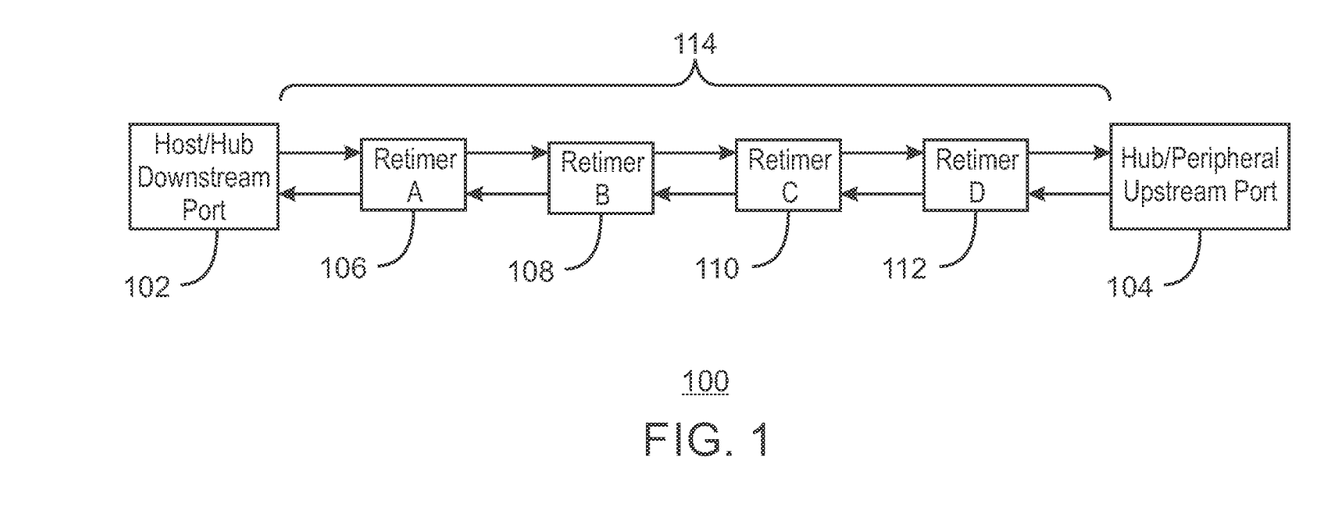
FIG. 1 is an exemplary illustration of a topology diagram for USB configuration.

FIG. 1 is an exemplary illustration of a topology diagram 100 for USB configuration. In embodiments, the topology diagram 100 is a USB 3.1 configuration. FIG. 1 includes a first port 102 and a second port 104. The first port 102 and the second port 104 may each be USB 3.1 ports. The first port 102 is a downstream port included within a hub or host of a system including this USB configuration. The second port 104 is an upstream port included within a hub or peripheral of the system including this USB configuration. A retimer 106, a retimer 108, a retimer 110, and a retimer 112 are included between the first port 102 and the second port 104. A link 114 connects the first port 102 to the second port 104. Typically, when traveling between a first port and a second port 104, a signal along a typical link may have a reduced amplitude, resulting in signal attenuation and jitter. As illustrated in the diagram 100, the retimer 106, the retimer 108, the retimer 110, and the retimer 112 can each analyze and alter the signal to prevent signal deterioration between the first port and the second port 104. In embodiments, one retimer is situated at the host, another retimer is situated at the device, and two retimers are situated at each end of a cable that is to connect the host and the device or peripheral. Additionally, in embodiments, the retimer at the host may be located on the host motherboard, with the retimer at the device located on the device motherboard, and two retimers in the cable that connects the host and the device.

Each retimer functions to retime or synchronize data received from upstream or downstream, whatever the case may be. Although four retimers are illustrated, there may be any number of retimers depending on the system configuration. Using a USB 3.1 configuration, there may be as many as four retimers between the two USB 3.1 ports. In any protocol, each retimer can operate as an encoder for an optical digital transmission. In this manner, the retimer can minimize glitches and jitter distortion. In embodiments, the retimers can control acquisition and transmission of the signals received.

When a port of the host and a port of the device are connected, a closed loop is formed where the number of retimers is determined. An index of each retimer may also be determined. The number of retimers between the host and the device are not known before the connection between the host and the device occurs. Rather, an algorithm is used to determine the number of retimers present, an index or an address of the retimers, and a method to communicate with the retimers. This algorithm can be implemented concurrently with the link initialization. In embodiments, the algorithm is a bubble algorithm. The algorithm enables the retimers to announce their presence and provide an index for them to be accessed for multi-protocol discovery and configuration, such that each port can determine which protocol to operate as during the initialization process. In examples, the protocols can be according to the following: Universal Serial Bus Revision 3.1 Specification released on Jul. 26, 2013; Peripheral Component Interconnect Express (PCI-E) announced Nov. 29, 2011; or DisplayPort. Although specific protocols and standards are listed, the present techniques may be used with any I/O technology.

The bubble algorithm is used to enable each retimer, upon receiving an incoming binary message, to announce its presence by asserting a bit in a reserved field and then forwarding the incoming message. The incoming message can be any message with a reserved field as defined by the protocol used. As illustrated in FIG. 1, multiple retimers exist along the link 114. If multiple retimers exist in a link, then each retimer will perform the same operation of asserting a bit in a reserved field and then forwarding the incoming message. The ensuing retimers will also shift the bits asserted by preceding retimers. This exchange is performed in both directions along the link, i.e. from the upstream port to the downstream port and vice versa. In this manner, a port at the destination, being a host/hub downstream port, or a hub/peripheral upstream port, will know how many retimers are present along the link. By announcing the presence of each retimer in both directions, both ports are able to collect link configuration information in terms of number of retimers in between them. Both ports are able to perform retimer accesses based on their relative indexing of each retimer. Each retimer also becomes aware of the link configuration in terms of the number of retimers present, and the retimer's relative location within the link topology. This in turn enables the retimer's automatic index assignment for subsequent address decoding.

Figure 2:
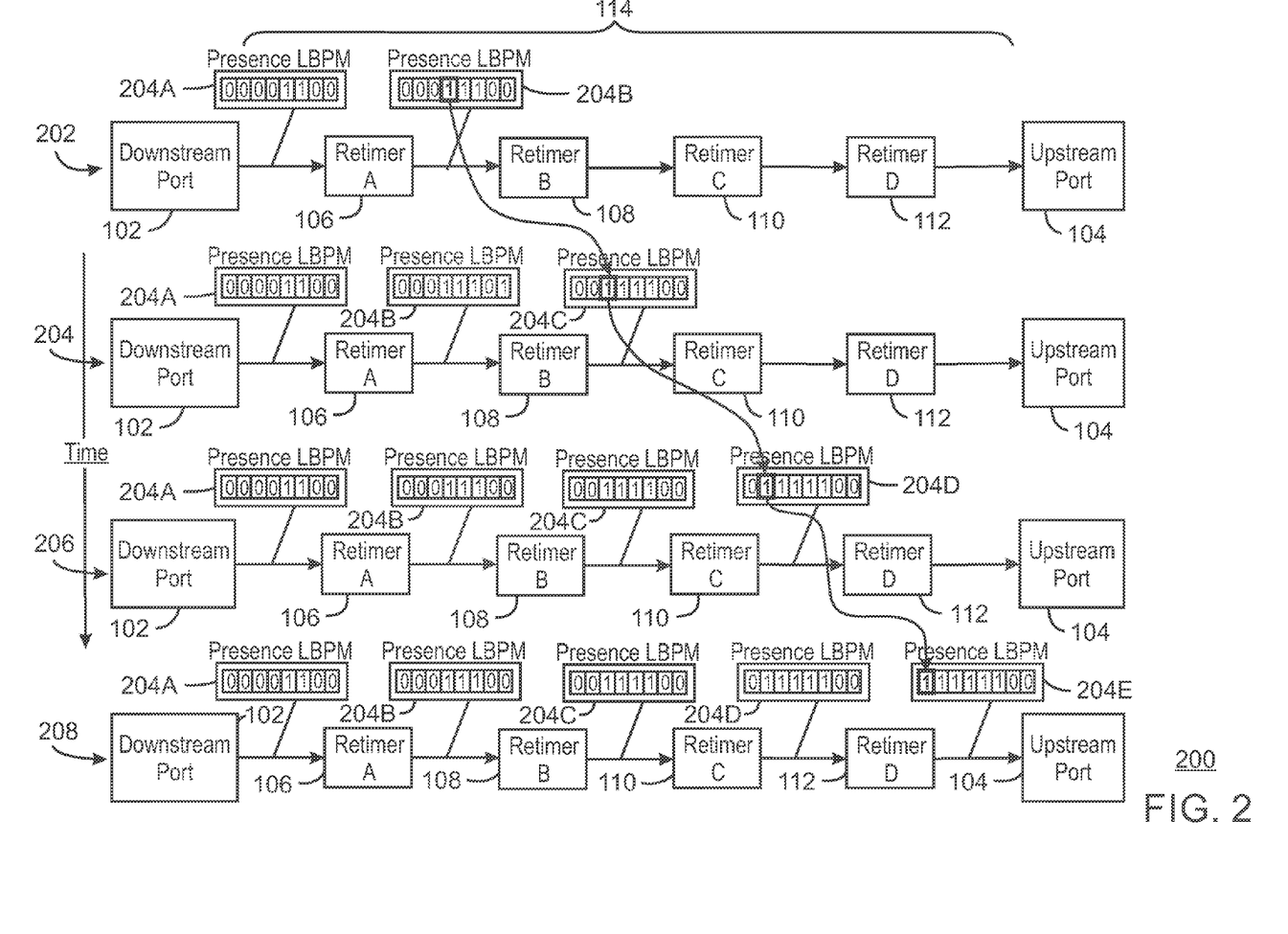
FIG. 2 is a diagram of the bubble algorithm applied to a system topology at various point in time.

FIG. 2 is a diagram 200 of the bubble algorithm applied to a system topology at various point in time. Similar to FIG. 1, FIG. 2 includes a first port 102 and a second port 104. The retimer 106, the retimer 108, the retimer 110, and the retimer 112 are included between the first port 102 and the second port 104 along the link 114. The link 114 may be an active cable. In embodiments, the bubble algorithm is executed during an initialization stage of the link 114 before communication is started between the first port 102 and the second port 104. In some cases, the communication between the first port 102 and the second port 104 is high speed communication. All ports and retimers are capable of communicating with each other based on a low-frequency periodic signal (LFPS). In particular, the ports and retimers can communicate using LFPS Based Pulse-width modulation Signaling (LBPS).

Pulse width modulation (PWM) can be used to alter with width of each pulse in order to encode data for transmission. Each pulse occurs during a time period, and the pulse may be a low frequency periodic signal. During each bit time period, the pulse can be used to indicate the particular bit value sent depending on the location of the pulse within the time period. The bit value may be a logic level one or a logic level zero, depending on the pulse during each bit time period. For example, if a pulse occurs during the third of the time period with no pulse during the remaining two thirds of the time period, a logic zero level is encoded. If a pulse occurs during the first two thirds of the time period with no pulse during the remaining third of the time period, a logic one level is encoded.

The LBPS can be used to create an LFPS Based Pulse-width modulation Message (LBPM). The LFPS, LBPS, and LBPM are signaling and messaging techniques each defined by the USB 3.1 protocol. During initialization, the downstream port and upstream port will transmit an LBPM between the two ports to communicate an ensuing USB operation. The ports announce their capabilities, such as data rates, number of lanes, and the like. When retimers are present, the LBPM will pass through the retimers. When each retimer receives the LBPM, it will insert a bit in a reserved field that is dedicated to the retimers in order to announce their presence. The retimers will then forward the LBPM to the next retimer or port along the link. The LBPM includes a reserved field for the retimers to announce their presence may be referred to as a presence LBPM. A presence LBPM is sent by each retimer to announce the retimer's presence during initialization. In embodiments, the presence LBPM may be any message defined by the USB 3.1 protocol. For example, the presence LBPM may be a capabilities message sent during initialization, where the retimers announce their presence using the reserved field of the capabilities message. Although signal and messaging is described herein using the USB 3.1 protocol, the present techniques may be implemented using any input/output (I/O) protocol. Accordingly, each retimer may send a presence message to announce the retimer's presence during initialization, where the presence message is any message used where a retimer inserts a bit in a reserved field that is dedicated to the retimers in order to announce its presence.

In the example of FIG. 2, USB 3.1 ports are illustrated. The USB 3.1 ports can send a capabilities message as defined by the USB 3.1 standard. In a capabilities message, the upper four bits are reserved, while the lower four bits are used to convey capabilities between the ports. Each retimer can use the upper four reserved bits to announce its presence. While a capability message is used as an example, any message can be used according to present techniques. Further, the bits used to announce the presence of the retimers are not restricted to the upper four bits of the message, and any available bits according to the particular protocol or standard can be used. By using a message as defined by the standard to announce the presence of the retimers, two operations can be combined into a single message. Specifically, the automatic retimer presence detection and indexing may be combined with another message being sent according to the standard. However, in embodiments, an LBPM can be defined for automatic retimer presence detection and indexing.

As illustrated in FIG. 2, at time 202, an initial presence LBPM 204A is sent along the link 114 from the downstream port 102 to the upstream port 104. The retimer 106 examines if any bit in the reserved field is being set to determine if it is immediately placed by the downstream port 102, or if there are retimers placed in between itself and the downstream port 102. In this example, the retimer 106 finds no bit is set in the reserved field and concludes that it is placed just after the downstream port 102. It then adds a logic level one to the presence LBPM in the reserved field at bit four to announce its presence, as indicated by the LBPM 204B. At time 204, the presence LBPM 204B is sent along the link 114 from the retimer 106 to the retimer 108. The same operation is performed by the retimer 108 as the retimer 106. The retimer examines the LBPM 204B and concludes that it is placed to the downstream port 102 with one retimer 106 in between retimer 108 and the downstream port 102. The retimer 108 then adds a logic level one to the presence LBPM at bit five to announce its presence, as indicated by the LBPM 204C.

At time 206, the presence LBPM 204C is sent along the link 114 from the retimer 108 to the retimer 110. The retimer 110 adds a logic level one at bit six of the presence LBPM to announce its presence, as indicated by the LBPM 204D. Similarly, at time 208, the presence LBPM 204D is sent along the link 114 from the retimer 110 to the retimer 112. The retimer 112 adds a logic level one to the presence LBPM at bit five to announce its presence, as indicated by the LBPM 204E. In this manner, each retimer can determine how many retimers are there between the retimer itself and the downstream port 102. Note that the same operation is performed from the upstream port 104 to the downstream port 102, and therefore, each retimer can determine its relative position between the retimer itself and the upstream port 104. Thus, at the end of the operation, each retimer can determine its relative position to the downstream port 102 and the upstream port 104. The downstream port 102 and the upstream port 104 can also determine how many retimers are there in between them. Every component of the link will automatically recognize the topology and configuration of the link and their relative position within the link. In embodiments, the ports can configure retimers. Specifically, the ports can check the status of each retimer and can also perform a configuration of the retimer. After the presence detection, each port can communicate with each retimer. An access LBPM can be sent to each retimer to alert the retimer that the port wants to communicate with or access the retimer. Additionally, each retimer may be equipped with the ability to support multiple protocols. As a result, although the present techniques are described using a USB 3.1 protocol, the present techniques can be implemented using any I/O protocol.

Figure 3:
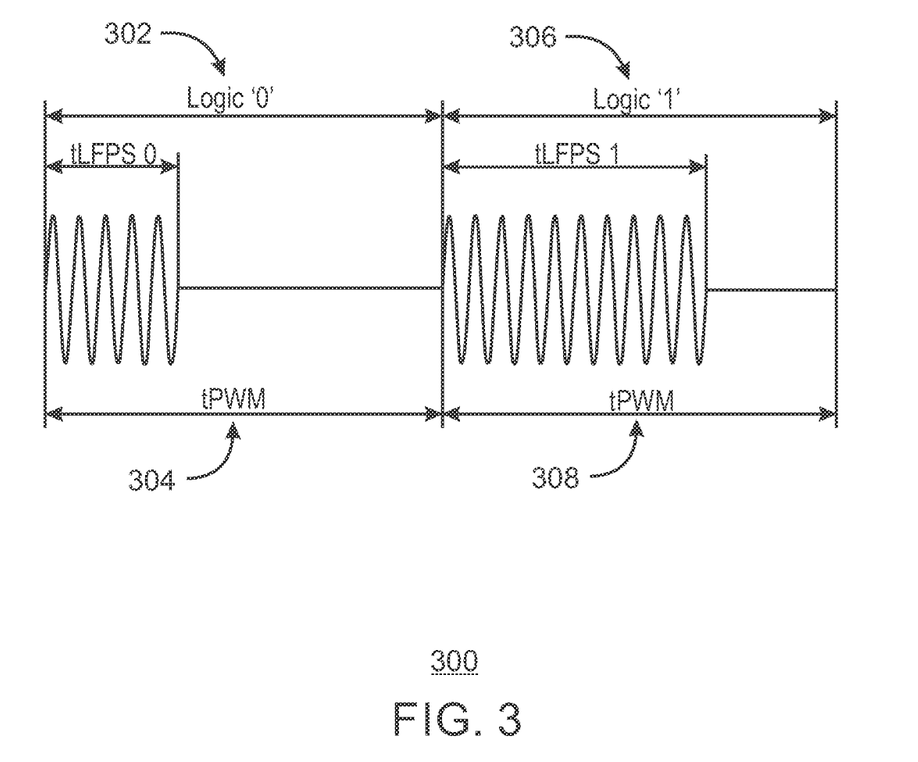
FIG. 3 is an illustration of a logic representation using a low frequency periodic signal generated through pulse width modulation.
Figure 4:
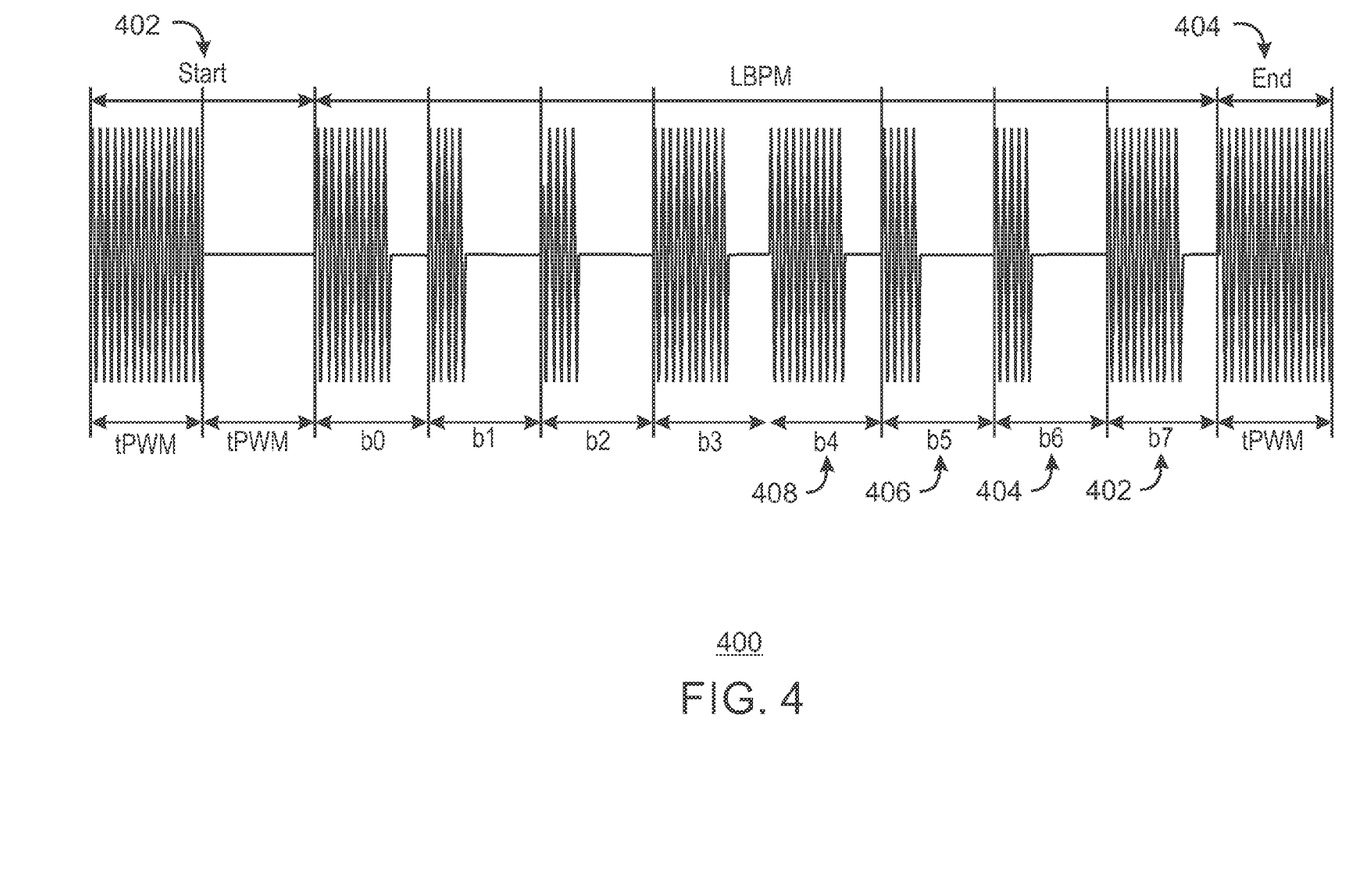
FIG. 4 is an illustration of LFPS Based Pulse-width modulation Message (LBPM)

FIG. 3 is an illustration of a logic representation 300 using a low frequency periodic signal generated through pulse width modulation. In embodiments, the logic representation 300 is based on LBPS. An LBPM may be defined as 8-bit LBPS with two delimiters at the beginning and the end of the byte as illustrated in FIG. 4. In examples, a logic level zero at reference number 302 can be represented by a low frequency periodic signal occurring during 30% of a time period 304, with 70% no signals during the same time period 304. In some cases, the 70% of no low frequency periodic signal can be referred to as low frequency periodic signal electric idle. A logic level one at reference number 306 can be represented by a low frequency periodic signal occurring during 70% of a time period 308, with no signals during 30% of the same time period 308. In some cases, the 30% of no low frequency periodic signal can be referred to as low frequency periodic signal electric idle. The signal to no signal ratio described herein is exemplary, and any ration of signal to no signal pulse width modulation can be used.

FIG. 4 is an illustration of LFPS Based Pulse-width modulation Message (LBPM). At the start of the LBPM is a delimiter 402. The delimiter 402 includes two tPWM periods. At the end of the LBPM is another delimiter 404 that includes a single PWM period. The delimiter 402 uses a tPWM period with a low frequency periodic signal followed by a second tPWM period with no signal. In embodiments, a delimiter such as the delimiter 402 signals the start of the LBPM. The delimiter 404 includes a tPWM period with a low frequency periodic signal to indicate the end of the LBPM. In this manner, the delimiter 402 and delimiter 404 can be used to transmit a complete byte to a receiver.

For example, consider the downstream port 102, retimer 106, retimer 108, retimer 110, retimer 112, and the upstream port 104 illustrated in FIGS. 1 and 2. A presence LBPM is defined such that bit 7 at reference number 402, bit 6 at reference number 404, bit 5 at reference number 406, and bit 4 at reference number 408 are used to indicate the LBPM. Also assume that if b7~b4="1001", the LBPM denotes retimer presence message. During the initialization, the downstream port such as the downstream port 102 may transmit a presence message with b3-b0 de-asserted. Upon detecting the presence LBPM, the retimer 106 asserts bit-3 to indicate its presence before forwarding the presence LBPM, and declares "1000" as its index towards the downstream port 102. The retimer 108, upon detecting the presence LBPM, performs the same operation as the retimer 106 by asserting bit-2 to indicate its presence before forwarding. The retimer 108 also becomes aware of its relative location to the downstream port 102 and declares "1100" as its index towards the downstream port. This process of operation continues through retimers 110 and 112 until the presence LBPM reaches the upstream port 104. Therefore, the retimers 110 and 112 will declare "1110" and "1111" as their respective indexes towards the downstream port. Upon receiving the final presence LBPM, the upstream port 104 becomes of aware of the number of the retimers in the link. Similarly the same operation is carried out in the reversed direction from the upstream port 104 through retimer 112 to retimer 106, and to the downstream port 102. As a result, the retimers from 112 to 106 will declare "0001", "0011", "0111" to "1111" as their respective indexes towards the upstream port 104. At the end of the operation, both the downstream port 102 and the upstream port 104 are aware of the presence of the retimers in the link and their relative index, and may start perform various operations such as discovery of the retimer features and capabilities, and retimer configurations. Although this example referred to a generic LBPM, and presence message can be used.

Figure 5:
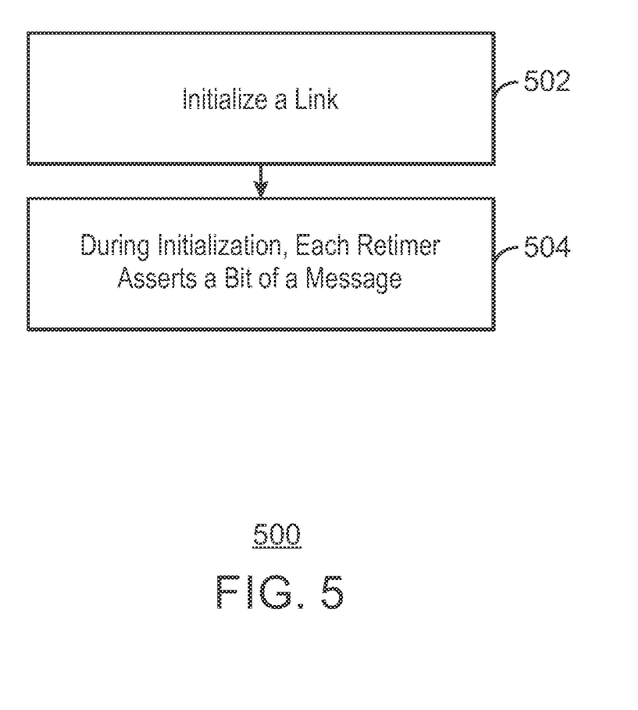
FIG. 5 is a process flow diagram of a method for automatically detecting retimer presence and index.

FIG. 5 is a process flow diagram of a method for automatically detecting retimer presence and index. At block 502, a link is initialized. In some cases, the link is an active cable. In embodiments, the link is a dual-simplex link that forms a closed loop between an upstream port 104 and a downstream port 102. At block 504, each retimer asserts a bit of a message sent during initialization of the link. In embodiments, the message sent during initialization is a defined message according to the link protocol. Additionally, in embodiments, the retimer asserts a bit in a reserved field of the defined message. The defined message is any message according to the protocol supported by the ports. In embodiments, the message is an LBPM sent during initialization according to the USB 3.1 protocol.

Figure 6:
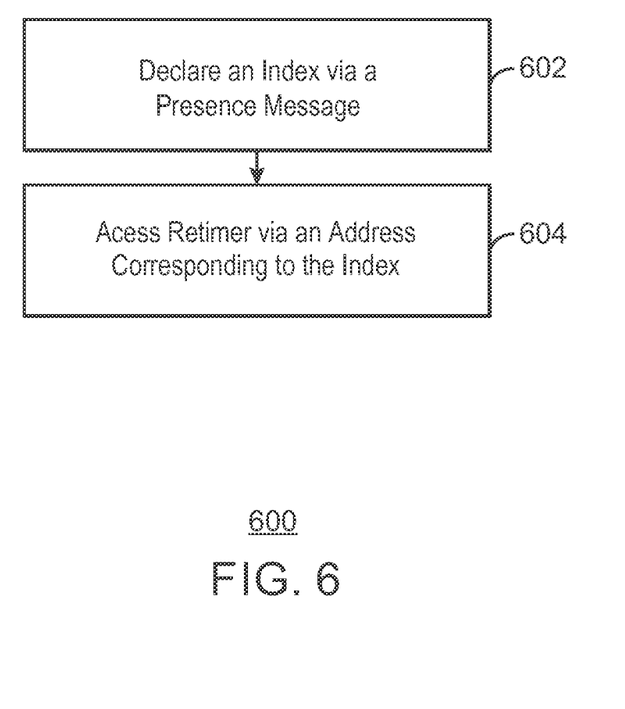
FIG. 6 is a process flow diagram of a method for automatically detecting retimer presence and index in a USB 3.1 configuration.

FIG. 6 is a process flow diagram of a method for accessing a retimer. At block 602, the retimer declares an index via a presence message. At block 604, the retimer is accessed via an address corresponding to the index. As discussed above, the retimer can asserts a bit in a reserved field of the presence message to announce the present of the retimer and declare an index. In embodiments, the presence message is an LBPM sent during initialization according to the USB 3.1 protocol. The presence message may be combined with any defined message, such as a Capability Message as defined according to a USB3.1 standard.

Figure 7:
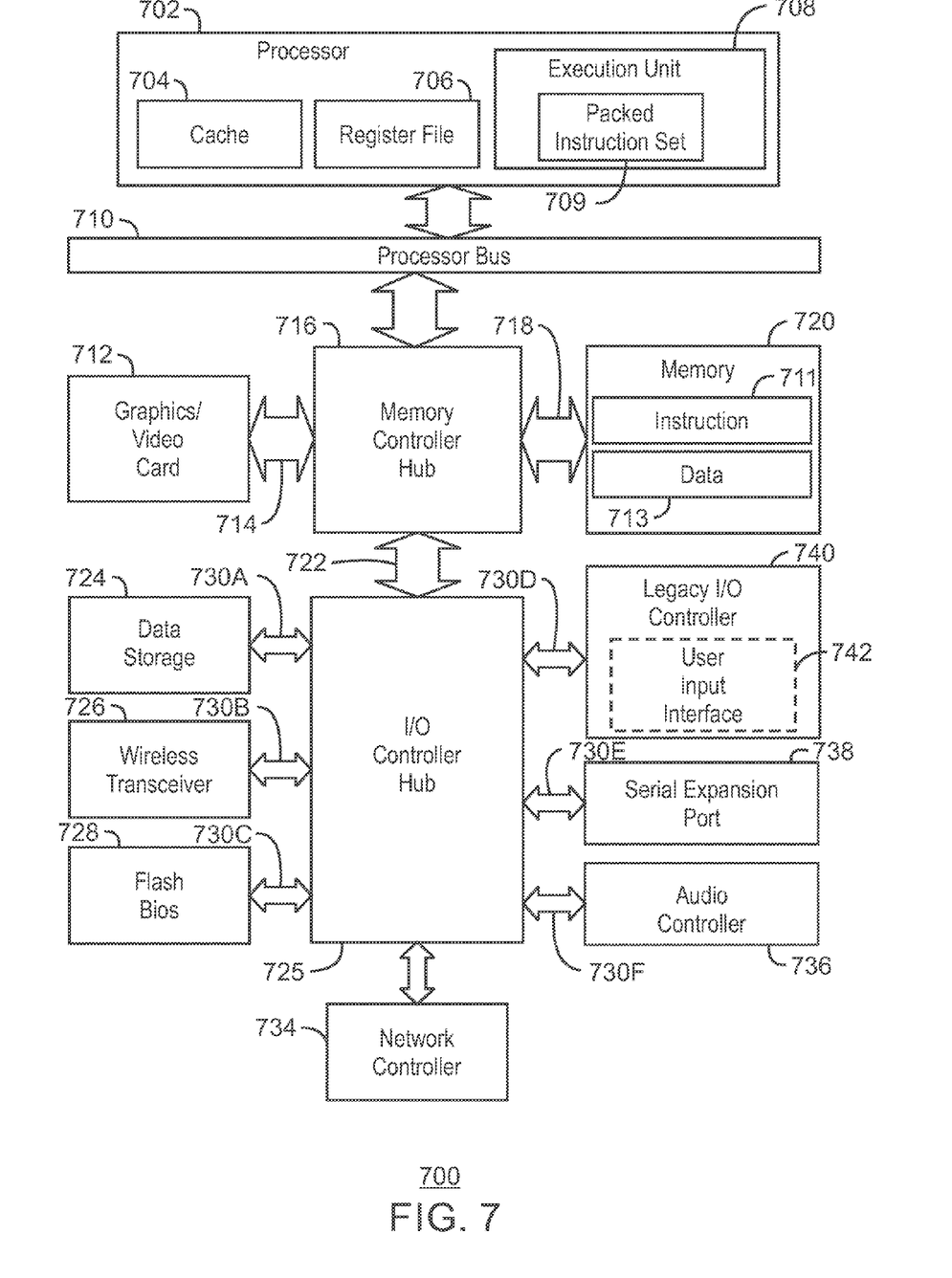
FIG. 7 is a block diagram of an exemplary computer system.

FIG. 7 is a block diagram of an exemplary computer system 700. The system 700 includes a processor with execution units to execute an instruction, where one or more of the interconnects implement one or more features in accordance with one embodiment of the present invention is illustrated. The system 700 includes a component, such as a processor 702 to employ execution units 708 including logic to perform algorithms for process data, in accordance with the present invention, such as in the embodiment described herein. In some cases, system 700 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In embodiments, system 700 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

The embodiments described herein are not limited to computer systems. Alternative embodiments of the present techniques can be used in other devices, such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 702 includes one or more execution units 708 to implement an algorithm that is to perform at least one instruction 711. One embodiment may be described in the context of a single processor desktop or server system, but alternative embodiments may be included in a multiprocessor system. System 700 is an example of a 'hub' system architecture. The computer system 700 includes a processor 702 to process data signals. The processor 702, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 702 is coupled to a processor bus 710 that transmits data signals between the processor 702 and other components in the system 700. The elements of system 700 (e.g. graphics accelerator 712, memory controller hub 716, memory 720, I/O controller hub 725, wireless transceiver 726, Flash BIOS 728, Network controller 734, Audio controller 736, Serial expansion port 738, I/O controller 740, etc.) perform their conventional functions that are well known to those familiar with the art.

In one embodiment, the processor 702 includes a Level 7 (L1) internal cache memory 704. Depending on the architecture, the processor 702 may have a single internal cache or multiple levels of internal caches. Other embodiments include a combination of both internal and external caches depending on the particular implementation and needs. Register file 706 is to store different types of data in various registers including integer registers, floating point registers, vector registers, banked registers, shadow registers, checkpoint registers, status registers, and instruction pointer register.

Execution unit 708, including logic to perform integer and floating point operations, also resides in the processor 702. The processor 702, in one embodiment, includes a microcode (ucode) ROM to store microcode, which when executed, is to perform algorithms for certain macroinstructions or handle complex scenarios. Here, microcode is potentially updateable to handle logic bugs/fixes for processor 702. For one embodiment, execution unit 708 includes logic to handle a packed instruction set 709. By including the packed instruction set 709 in the instruction set of a general-purpose processor 702, along with associated circuitry to execute the instructions, the operations used by many multimedia applications may be performed using packed data in a general-purpose processor 702. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 708 may also be used in micro controllers, embedded processors, graphics devices, DSPs, and other types of logic circuits. System 700 includes a memory 720. Memory 720 includes a dynamic random access memory (DRAM) device, a static random access memory (SRAM) device, flash memory device, or other memory device. Memory 720 stores instructions 711 and/or data 713 represented by data signals that are to be executed by the processor 702.

Note that any of the aforementioned features or aspects of the present techniques may be utilized on one or more interconnects illustrated in FIG. 7. For example, an on-die interconnect (ODI), which is not shown, for coupling internal units of processor 702 implements one or more aspects of the invention described above. The invention is associated with a processor bus 710 (e.g. Intel Quick Path Interconnect (QPI) or other known high performance computing interconnect), a high bandwidth memory path 718 to memory 720, a point-to-point link to graphics accelerator 714 (e.g. a Peripheral Component Interconnect express (PCIe) compliant fabric), a controller hub interconnect 722, and an I/O or other interconnect (e.g. USB, PCI, PCIe) 730A, 730B, 730C, 730D, 730E, and 730F for coupling the other illustrated components. Some examples of such components include the audio controller 736, firmware hub (flash BIOS) 728, wireless transceiver 726, data storage 724, legacy I/O controller 710 containing user input and keyboard interfaces 742, a serial expansion port 738 such as Universal Serial Bus (USB), and a network controller 734. The data storage device 724 can comprise a hard disk drive, a floppy disk drive, a CD-ROM device, a flash memory device, or other mass storage device.

The block diagram of FIG. 7 is not intended to indicate that the computing device 700 is to include all of the components shown in FIG. 7. Further, the computing device 700 may include any number of additional components not shown in FIG. 7, depending on the details of the specific implementation.

EXAMPLE 1

An apparatus for retimer presence detection is described herein. The apparatus includes at least one retimer. The apparatus also includes control associated with the retimer to assert at least one bit of a presence message during link initialization to announce the retimer's presence.

The at least one retimer may declare an index and is accessible via the index. The control may be based on a bubble algorithm to assert at least one bit of the presence message. Additionally, the at least one retimer is to synchronize and regenerate deteriorated signals from a receiving port to a transmitting port. The at least one retimer may be configurable and discoverable, and the at least one retimer may support multiple protocols. Further, the at least one retimer may control acquisition and transmission of received signals. The at least one retimer may be a USB 3.1 retimer. The apparatus may include a plurality of retimers, wherein a first retimer is a component of a host, a second retimer is a component of a device, and two retimers are situated at each end of a cable that is to connect the host and the device. A first presence message from the host to the device enables each retimer to declare an index from the host to the device, and a second presence message from the device to the host enables each retimer to declare an index from the device to the host.

EXAMPLE 2

A system for retimer presence detection and indexing is described herein. The system includes a first port, a second port, and a plurality of retimers. A link including a retimer of the plurality of retimers is to connect the first port and the second port and logic is to enable the plurality of retimers to announce their presence by asserting a bit of a presence message during link initialization and to declare an index based on the presence message.

Each retimer of the plurality of retimers declares an index and may accessible via the index. The logic may be based on a bubble algorithm. Each retimer of the plurality of retimers may also synchronize and regenerate deteriorated signals from a receiving port to a transmitting port. Further, the presence message may be an LFPS Based Pulse-width modulation Message (LBPM). The plurality of retimers may to support multiple protocols. Further, the plurality of retimers may to declare an index and announce their presence by asserting a bit of a presence message during link initialization from the first port to the second port, and vice versa. The link may an active cable, and the plurality of retimers may be USB 3.1 retimers. The logic may determine the link configuration.

EXAMPLE 3

A method of retimer presence and detection is described herein. The method includes initializing a link between a first port and a second port, wherein a plurality of retimers are located between the first port and the second port. The method also includes sending a presence message between the first port and the second port, wherein logic is to enable the plurality of retimers to announce their presence by asserting a bit of a presence message during link initialization and to declare an index based on the presence message.

The logic may be based on a bubble algorithm, and each retimer asserts the bit of the presence message before forwarding the presence message along the link. The presence message may be combined with a defined message. Additionally, the link may be an active cable. The presence message may be an LFPS Based Pulse-width modulation Message (LBPM). The first port and the second port may each support multiple protocols. Also, the first port and the second port may be USB 3.1 ports. The logic can be implemented concurrently with the link initialization. The LFPS Based Pulse-width modulation Message (LBPM) may be a Capability message. The plurality of retimers can prevent signal deterioration along the link.

EXAMPLE 4

An apparatus for retimer presence detection is described herein. The apparatus includes at least one retimer, wherein the retimer includes a means to announce the retimer's presence during link initialization.

The means to announce the retimer's presence may assert a bit of a presence message. The means to announce the retimer's presence may also declare an index and may be accessible via the index. The means to announce the retimer's presence can assert a bit of a presence message via an algorithm, and the means to announce the retimer's presence can be based on a bubble algorithm. The at least one retimer may synchronize and regenerate deteriorated signals from a receiving port to a transmitting port. Further, the at least one retimer may be configurable and discoverable using the means to announce the retimer's presence. The at least one retimer may support multiple protocols. The at least one retimer may control acquisition and transmission of received signals. Additionally, the at least one retimer may be a USB 3.1 retimer. The apparatus may include a plurality of retimers, wherein a first retimer may be a component of a host, a second retimer may be a component of a device, and two retimers are situated at each end of a cable that may connect the host and the device. A first presence message from the host to the device may enable each retimer to declare an index from the host to the device, and a second presence message from the device to the host may enable each retimer to declare an index from the device to the host.

EXAMPLE 5

A tangible, non-transitory, computer-readable medium is described herein. The tangible, non-transitory, computer-readable medium includes code to direct a processor to initialize a link between a first port and a second port, wherein a plurality of retimers are located between the first port and the second port. The tangible, non-transitory, computer-readable medium also includes code to direct a processor to send a presence message between the first port and the second port, wherein logic is to enable the plurality of retimers to announce their presence by asserting a bit of a presence message during link initialization and to declare an index based on the presence message.

The logic may be based on a bubble algorithm, and each retimer may assert the bit of the presence message before forwarding the presence message along the link. The presence message may be combined with a defined message, and the link may be an active cable. The presence message can be an LFPS Based Pulse-width modulation Message (LBPM). The first port and the second port can each support multiple protocols. The first port and the second port may be USB 3.1 ports. Additionally, the logic may be implemented concurrently with the link initialization. The LFPS Based Pulse-width modulation Message (LBPM) may be a Capability message. The plurality of retimers can prevent signal deterioration along the link.

EXAMPLE 6

An apparatus is described herein. The apparatus includes a retimer for a high speed serial interconnect. The retimer includes, but not limited to a receiver, a control, and a transmitter. The receiver is to receive a message that is to include a particular field, and the control is to update the particular field with a retimer value to announce a presence of the retimer inband. The transmitter is to transmit a message to include the particular field.

The control may update the particular field based on a bubble algorithm Updating the particular field may include asserting a bit of the particular field. Additionally, updating the particular field may include a logical shift of at least one bit of the particular field. The transmitter may be coupled to an upstream device. The upstream device may include a control to determine a number of retimers along the high speed serial interconnect, the number of retimers based on the retimer value, and perform retimer access based on the retimer's relative indexing with respect to the number of retimers.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

Some embodiments may be implemented in one or a combination of hardware, firmware, and software. The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus for retimer presence detection, comprising:
   at least one retimer;
   a control associated with the at least one retimer to assert at least one bit in a reserved field of a presence message during link initialization to announce the at least one retimer's presence and the at least one retimer to shift any bits asserted by one or more preceding retimers, wherein a final presence message is to specify each retimer on a link and each retimer's relative index.

2. The apparatus of claim 1, wherein the at least one retimer declares an index and is accessible via the index.

3. The apparatus of claim 1, wherein the control is to assert the at least one bit of the presence message based on a bubble algorithm.

4. The apparatus of claim 1, wherein the at least one retimer is to synchronize and regenerate deteriorated signals from a receiving port to a transmitting port.

5. The apparatus of claim 1, wherein the at least one retimer is configurable and discoverable.

6. The apparatus of claim 1, wherein the at least one retimer is to support multiple protocols.

7. The apparatus of claim 1, wherein the at least one retimer is to control acquisition and transmission of received signals.

8. The apparatus of claim 1, wherein the at least one retimer is a USB 3.1 retimer.

9. A system for retimer presence detection and indexing, comprising:
a first port;
a second port;
a plurality of retimers, wherein a link including a retimer of the plurality of retimers is to connect the first port and the second port and logic is to enable the plurality of retimers to announce their presence by asserting a bit of a presence message during link initialization and to declare an index based on the presence message, wherein a final presence message is to specify each retimer on a link and each retimer's relative index.

10. The system of claim 9, wherein the each retimer of the plurality of retimers declares an index and is accessible via the index.

11. The system of claim 9, wherein the logic is based on a bubble algorithm.

12. The system of claim 9, wherein each retimer of the plurality of retimers is to synchronize and regenerate deteriorated signals from a receiving port to a transmitting port.

13. The system of claim 9, wherein the presence message is an LFPS Based Pulse-width modulation Message (LBPM).

14. The system of claim 9, wherein the plurality of retimers are to support multiple protocols.

15. The system of claim 9, wherein the plurality of retimers are to declare an index and to announce their presence by asserting a bit of a presence message during link initialization from the first port to the second port, and vice versa.

16. The system of claim 9, wherein the link is an active cable.

17. The system of claim 9, wherein the plurality of retimers are USB 3.1 retimers.

18. The system of claim 9, wherein an algorithm is to determine the link configuration.

19. A tangible, non-transitory, computer-readable medium comprising code to direct a processor to:
initialize a link between a first port and a second port, wherein a plurality of retimers are located between the first port and the second port;
send a presence message between the first port and the second port, wherein an logic is to enable the plurality of retimers to announce their presence by asserting a bit of a presence message during link initialization and to declare an index via the presence message, wherein a final presence message is to specify each retimer on a link and each retimer's relative index on the link.

20. The non-transitory, computer-readable medium of claim 19, wherein the logic is based on a bubble algorithm, and each retimer asserts the bit of the presence message before forwarding the presence message along the link.

21. The non-transitory, computer-readable medium of claim 19, wherein the presence message is combined with a defined message.

22. The non-transitory, computer-readable medium of claim 19, wherein the link is an active cable.

23. The non-transitory, computer-readable medium of claim 19, wherein the presence message is an LBPM.

24. The non-transitory, computer-readable medium of claim 19, wherein the first port and the second port each support multiple protocols.

25. The non-transitory, computer-readable medium of claim 19, wherein the first port and the second port are USB 3.1 ports.

26. An apparatus comprising:
a retimer of a plurality of retimers for a high speed serial interconnect, the retimer including but not limited to:
a receiver to receive a message that is to include a particular field;
a control to update the particular field with a retimer value to announce a presence of the retimer inband; and
a transmitter to transmit a message to include the particular field, wherein a final message is to specify each retimer on a link and each retimer's relative index.

27. The apparatus of claim 26, wherein the control is to update the particular field based on a bubble algorithm.

28. The apparatus of claim 26, wherein updating the particular field includes asserting a bit of the particular field.

29. The apparatus of claim 26, wherein updating the particular field includes a logical shift of at least one bit of the particular field.

30. The apparatus of claim 26, wherein the transmitter is coupled to an upstream device.

31. The apparatus of claim 30, wherein the upstream device includes a control to:
determine a number of retimers along the high speed serial interconnect, the number of retimers based on the retimer value; and
perform retimer access based on the retimer's relative indexing with respect to the number of retimers.

* * * * *